May 7, 1957  D. E. CHRISTOPHER  2,791,126
MOTOR BASE
Filed July 6, 1953  2 Sheets-Sheet 1
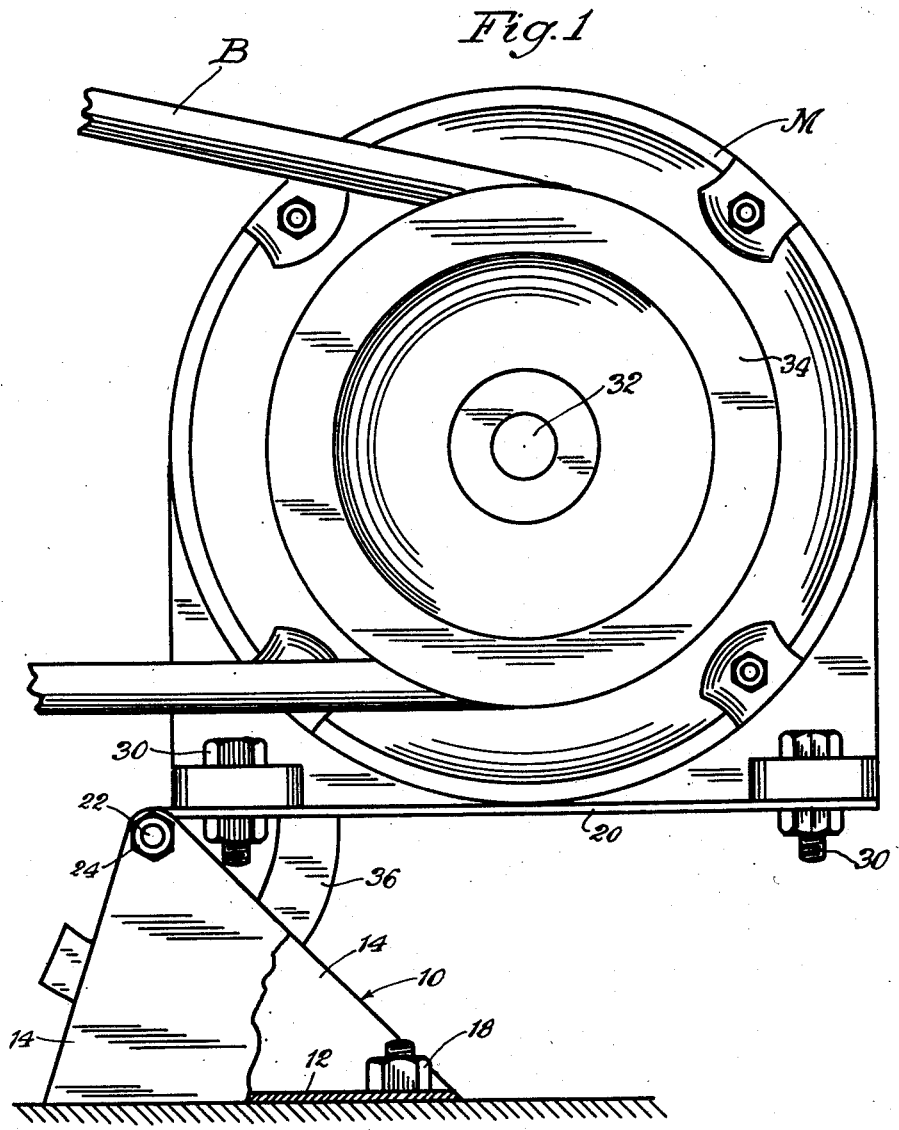
INVENTOR.
Daniel E. Christopher
BY Parker & Carter
Attorneys May 7, 1957  D. E. CHRISTOPHER  2,791,126
MOTOR BASE
Filed July 6, 1953  2 Sheets-Sheet 2
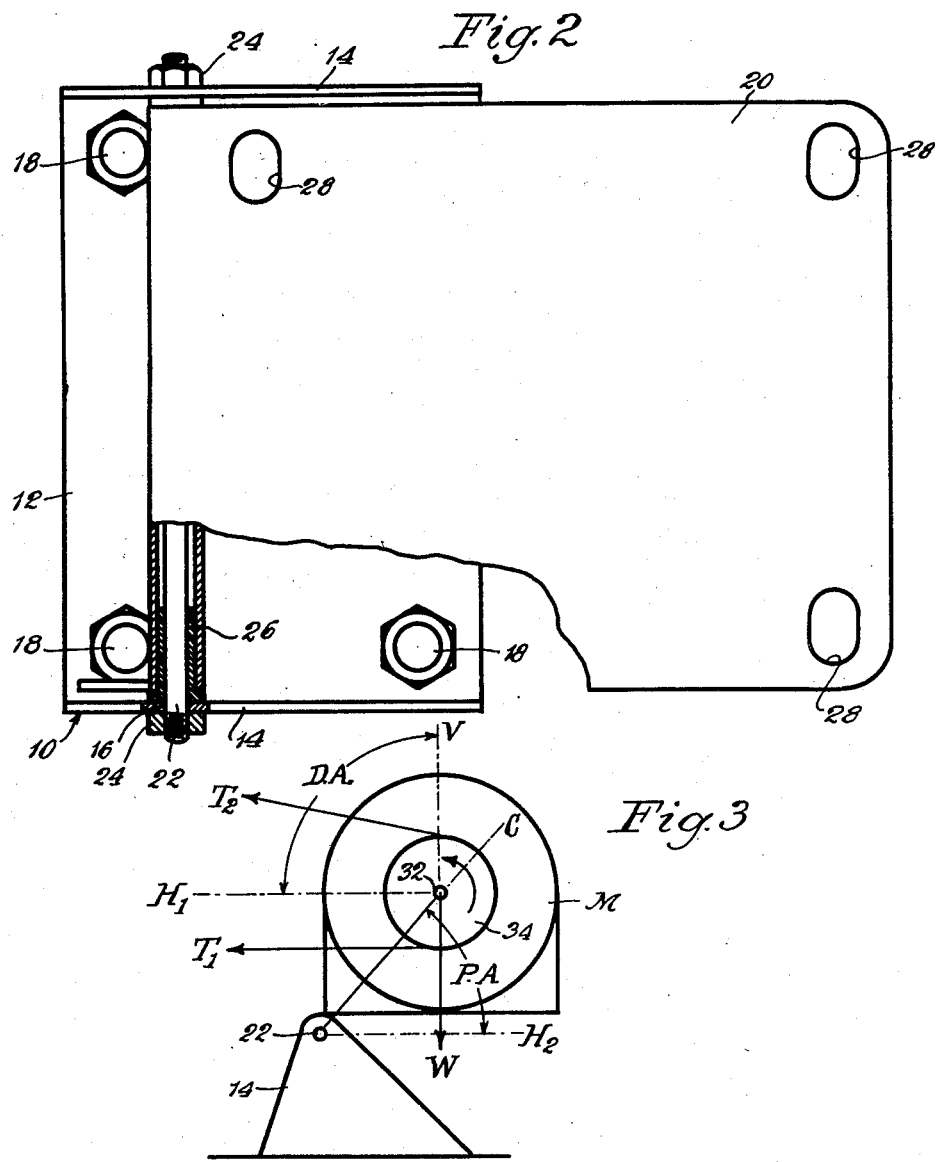
INVENTOR.
Daniel E. Christopher
BY Parker & Carter
Attorneys

United States Patent Office 2,791,126
Patented May 7, 1957

2,791,126

MOTOR BASE

Daniel E. Christopher, Houston, Tex.

Application July 6, 1953, Serial No. 366,263

1 Claim. (Cl. 74—242.13)

My invention resides in the field of pivoted motor base mountings, specifically electric motors, and is an improvement on prior bases which are pivoted to automatically compensate for the stretch of the belt by utilization of the weight of the motor itself.

The determination of proper belt tension is very important in the use of both V-belts and flat belt drives. If the tension in either type of belt is not substantially correct, the life of the belt will be materially shortened, excess wear on the bearings will result, and substantial damage may even be done to the motor and/or the driven unit. For example, if the tension in the belt is too small, the belt will slip and power will be lost. Furthermore, the belt will be noisy and premature belt failure will result.

It is therefore a primary object of my invention to provide a motor base mounting which will automatically compensate for both the stretch of the belt, which can amount to as much as four percent of a normal belt before it is worn out, and for the load on the motor.

Another object of my invention is a new and improved method of mounting and operating a pivoted motor whereby the mounting will maintain the motor and belt at their operating disposition of maximum efficiency to automatically compensate for the stretch of the belt and the load on it.

Another object of my invention is a new and improved motor base mounting which will automatically compensate for changing atmospheric conditions.

Another object of my invention is a motor base mounting adapted for efficient operation when the motor shaft is lower than the driven shaft.

Another object of my invention is the new and improved method and apparatus for mounting and operating an electric motor so as to provide the proper amount of extra tension required to handle the heavy starting loads, the overloads and any excessive shock, as well as to ease up on the belt tension during idling periods.

Another object of my invention is a properly positioned motor with correct belt tension for a drive with variable pitch sheaves.

Another object of my invention is a means for removing a belt from a sheave without disturbing the fundamental mounting of the motor and without making any adjustment.

Other objects will appear from time to time in the ensuing specification and drawings, in which:

Figure 1 is a view in end elevation of my new and improved motor base mounting;

Figure 2 is a top view of the motor base in Figure 1, with the motor removed and a portion of the base broken away to illustrate certain details; and Figure 3 is a diagrammatic view in end elevation, similar to Figure 1, indicating various operating angles and the vector forces on the motor base mounting.

In Figure 1, a saddle is indicated generally at 10 and is composed of a flat horizontal portion 12 with a pair of upstanding side portions 14. The side portions are suitably apertured, as at 16, to receive a pivot structure to be described hereinbelow. The saddle is connected to the floor by any number of suitable connecting elements such as the bolts 18. The saddle may be slotted to receive these bolts so that it can be adjustably mounted on a floor, or the connection to the floor can be made in any suitable manner.

A base 20 is pivoted to the upstanding side portions of the saddle through a hinge pin 22 which extends through the opening 16. The ends of the hinge pin are threaded to receive suitable connecting means such as the nuts 24. The pin carries a bearing or bushing 26 at each end in a suitable manner, and the forward edge of the base plate 20 is rolled around these bushings to provide a pivoted connection, it being understood that the forward edge of the base plate passes counterclockwise around bushings in Figure 1 until it contacts the under side of the plate. It should be understood that the base plate could be hinged to the bushings in a different manner. For example, the bushing sleeve could be a separate and distinct element from the base plate, with the base plate being attached thereto, and the positioning of the pivot with respect to the bushings need not always be in this particular position. The base plate 20 is apertured in a plurality of places as at 28, the apertures being transversely elongated slots which are adapted to receive the connecting means for a conventional electric motor.

In Figure 1, I have shown a motor M mounted on the base plate and connected through the slots 28 in the base by any suitable means such as the bolts 30. The motor shaft 32 carries a suitable driving sheave 34, and a suitable belt B, either a flat belt or a V-belt, passes about the sheave in a conventional manner.

The base carries an indicator 36 which includes an arcuate piece connected to the under side of the motor base in any suitable manner. This arcuate piece extends below the base pivot and is concentric with it. The forward edge of the arcuate piece extends beyond the forward edge of the supporting saddle. It should be understood that the surface of this arcuate indicating piece is graduated in any suitable manner to indicate the optimum driving conditions as set forth hereinbelow. The graduations on the arcuate indicating segment could coact with either the forward or rearward edge of the side portion 14 of the saddle, or the graduations could line up with an opening in the side portion of the saddle.

I have found that the angle of the drive is the most important factor affecting belt tension, and if this factor is not maintained between certain prescribed limits, improper tension will be acquired and the belt will wear excessively. When I speak of the "drive angle," I am referring to the angle formed between a horizontal line drawn through the axis of the motor and another line drawn through the axis of the motor and the axis of the driven unit. In most cases the axis of the driven unit can be taken as the center of the driven sheave. I have found that this drive angle should remain at all times between 0° and 90°. In Figure 3 I have indicated the drive angle at DA, this angle having the dotted line extremes $H_1$ and V. Therefore, a line drawn through the center 32 of the motor and the center of the driven unit should always reside within this angle DA. As the angle DA represents a 90° quadrant, the line between the centers of the driven and driving element will always be between the horizontal and vertical in this quadrant.

The arrows $T_1$ and $T_2$ represent the tension vectors on the two throws of the belt, and as the driving sheave 34 is indicated as rotating counterclockwise by the arrow superimposed thereon, $T_1$ will have a larger value than $T_2$.

I have also found that the angle between a line drawn through the base pivot and the motor shaft and the horizontal is a very critical factor, and if this angle can be kept at approximately 45°, the variations in belt tension will be at a minimum. In Figure 3 the horizontal through the base pivot is indicated at $H_2$ and the line through the motor shaft and the base pivot is indicated at C. This can be termed a "pivot angle" and is designated by the letters PA in Figure 3. I have found that if this angle is maintained at all times at approximately 45°, the variations in the belt tension will be at a minimum under all conditions.

The arrow W in Figure 3 indicates the vector for the weight of the motor, and this vector should always pass on the opposite side of the base pivot 22 from the driven unit. Thus, the entire weight of the motor tends to pivot the base downwardly or clockwise and the weight is utilized to tension the belt. Of course, this tensioning factor will be constant, regardless of the load or speed of the motor.

On the other hand, the motor rotates counterclockwise in Figure 3 and the reaction torque set up in the motor is equal and in the opposite direction. Therefore, the reaction torque will also tend to tension the belt and it should be noted that the reaction torque varies in direct proportion to the load. Thus, as the load increases, the reaction torque will also increase its tensioning effect upon the belt.

The total torque tensioning the belt is the sum of the reaction torque and the weight torque. The weight torque is constant, regardless of the load. However, the reaction torque varies in direct proportion to the load. Consequently, the total torque will also vary in proportion to the load. When the load is light, the belt tension is low and is equal approximately to only the weight torque, but when the load is heavy, the tension is higher, due to the increasing reaction torque. The increase in tension is never too great and it is generally just great enough to carry the increased load. The indicating segment 36, as stated above, is graduated to indicate the optimum operating conditions and it should be noted that this indicator can be graduated to reflect directly the pivot angle PA. As this angle is maintained at approximately 45°, the indicating segment could be graduated to indicate when this angle is at 45°, and such indication could be done in any suitable manner; for example, by colors, a green section for proper operation with a 45° pivot angle bounded by red sections indicating improper operation at pivot angles above or below 45°. Of course, the colors are arbitrary and, in a sense, are not entirely necessary.

Any standard type of motor could be used, as the specific features of the motor are not pertinent to this invention. For example, the motor could be of the dripproof type or the splashproof variety. A totally enclosed and explosionproof motor could also be conveniently mounted on this type of pivoted base structure and the problems involved in mounting these types of motors on the base 20 are well within the confines of mechanical skill.

The simple construction and mechanical details of this structure should not be overlooked. I point specifically to the fact that this motor base design lends itself to very easy production. The saddle support could be simply cut from sheet metal in a standard shearing operation and stamped to turn up the end portions 14. The hinge plate lends itself readily to the use of a shear and press brake and does not require expensive dies. The dimension of the various parts is unimportant, as they can be suitably designed with proper dimensions depending upon the specific application of the device.

It should be noted that this pivoted motor base structure will automatically compensate for any stretch of the belt, and compensation will also be effected for load variations by the varying total torque. Additionally, the motor is mounted and operated with a pivot angle at approximately 45°, with the drive angle within stated limits, so that the variations in belt tension will be at a minimum. The drive angle requires that the motor shaft is always lower than the driven shaft, and the mounting of the motor additionally automatically compensates for variations in atmospheric conditions.

It should be noted that my pivoted motor base mounting could be used to provide correct belt tension for a drive which employs variable pitch sheaves, two such sheaves being employed on a drive with fixed center distances, and the adjustment of one being opposite to the adjustment of the other. On the other hand, if only one such sheave is used in a conventional motor base mounting, a separate means must be employed for changing the drive center distance or taking up belt slack, for example, by an idler sheave. With my design, the pivoted motor base mounting automatically compensates for any such changes without disturbing the fundamental mounting of the motor.

With my motor base mounting, the belt can be removed from the sheave without disturbing the mounting of the motor and without requiring any adjustment. The centers are fixed in a conventional V-belt drive, the removal of the belt requires stretching or prying the belt out of the groove of the sheave, or possibly by adjusting the motor if it is mounted on a slidable base. With my design it is merely necessary to raise the motor on its pivoted platform sufficiently to lift the belt out of the sheave. By this procedure the belt may be readily replaced and proper belt tension will be automatically restored.

While I have shown and described a preferred form of my invention with various details thereof, it should be understood that numerous alterations, modifications and substitutions can be made without departing from the essential theme, and I wish that the invention be unrestricted except by the appended claim.

I claim:

A motor base mount including a saddle support adapted to be removably connected to a floor-type surface or the like, said mount having a pair of upwardly bent integral upstanding portions, a substantially flat motor base plate freely pivoted between the two upstanding portions so as to freely swing and adapted to receive an electric motor for driving a belt or the like, a pivot rod extending between the integral upstanding portions adjacent their upper end, the forward edge of the base plate being bent around the pivot rod to effect a pivotal connection therewith, and an indicating device connected to the base and disposed arcuately adjacent at least one of the upstanding portions to indicate the pivot angle of the base for proper belt tension, said indicating device being spaced from its adjacent upstanding portion and out of contact therewith so as to allow free pivotal movement of the base plate at all times, the base plate being constructed as a panel integral with the portion bent around the pivot rod.

References Cited in the file of this patent

UNITED STATES PATENTS

| | | |
|---|---|---|
| 1,935,878 | Hamerstadt | Nov. 21, 1933 |
| 2,024,127 | Coppock | Dec. 10, 1935 |
| 2,102,560 | Kimmich | Dec. 14, 1937 |
| 2,124,845 | Cobb | July 26, 1938 |
| 2,188,827 | Bradfield | Jan. 30, 1940 |
| 2,320,053 | Suloff | May 25, 1943 |
| 2,407,499 | Klossner | Sept. 10, 1946 |
| 2,631,800 | Pinkston | Mar. 17, 1953 |

OTHER REFERENCES

Advertisement circular of The Lovejoy Flexible Coupling Company, 2 pages.